O. C. SUTHERLAND & E. M. McLAUGHLIN.
INDICATOR FOR ELECTRICAL CONNECTIONS.
APPLICATION FILED APR. 5, 1916.
1,186,146.
Patented June 6, 1916.
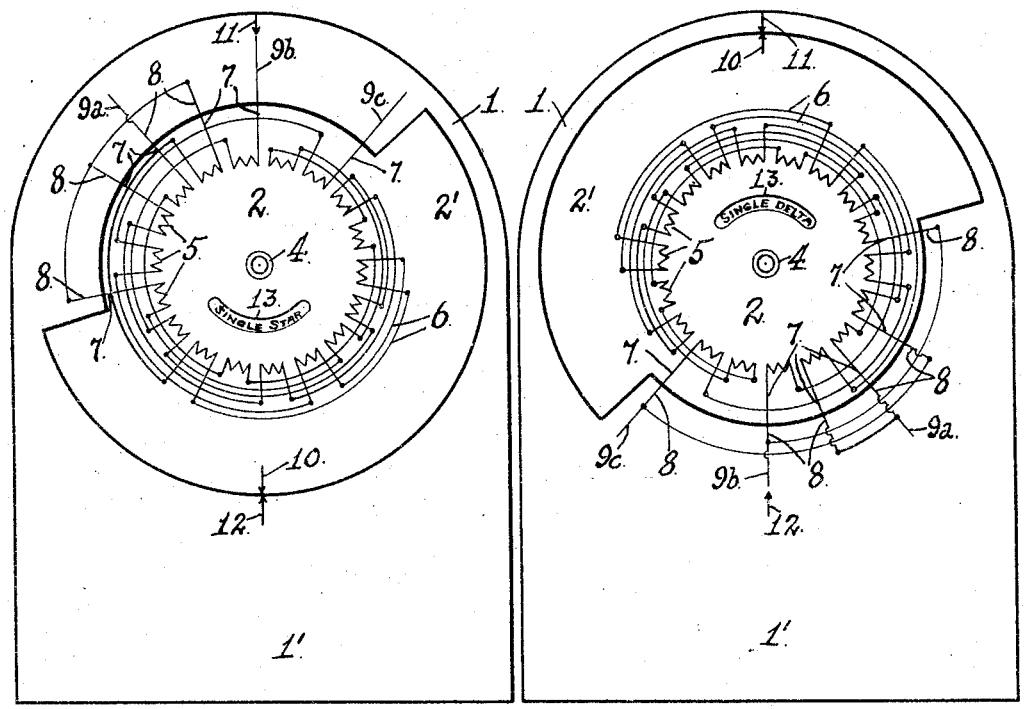
Fig. 1.  Fig. 2.
Fig. 3.  Fig. 4.
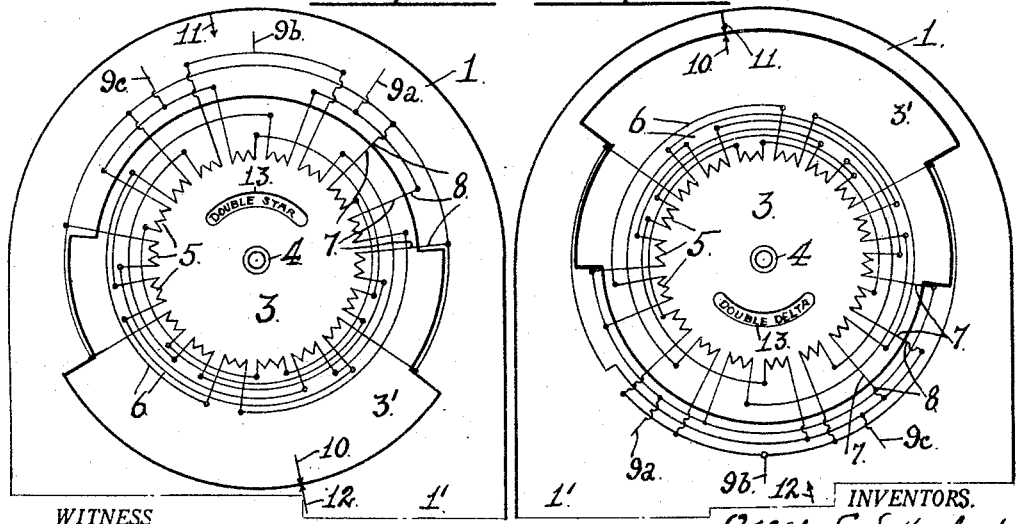
WITNESS
Wm F. Drew
INVENTORS.
Oscar C. Sutherland
Edward M. McLaughlin
BY Wm F. Book
ATTORNEY

UNITED STATES PATENT OFFICE.

OSCAR C. SUTHERLAND AND EDWARD M. McLAUGHLIN, OF RICHMOND, CALIFORNIA.

INDICATOR FOR ELECTRICAL CONNECTIONS.

1,186,146.   Specification of Letters Patent.   Patented June 6, 1916.

Application filed April 5, 1916. Serial No. 89,223.

*To all whom it may concern:*

Be it known that we, OSCAR C. SUTHERLAND and EDWARD M. McLAUGHLIN, citizens of the United States, residing at Richmond, in the county of Contra Costa and State of California, have invented certain new and useful Improvements in Indicators for Electrical Connections, of which the following is a specification.

Our invention relates to an indicator of the class in which two or more relatively movable members, each bearing indicating marks, may be relatively shifted to bring said marks into registry in various positions to give various resultant indications.

The object of the invention is to provide an indicator of the class described, by which diagrams of various electric circuits and connections are shown, so that by the manipulation of one device, a number of such diagrams may be formed.

The device in its preferred form is adapted for indicating the four most commonly employed systems of connecting the field coils of alternating current motors of the polyphase type, and as such is hereinafter described. It is to be understood, however, that it may also be adapted to show diagrams of other connections and circuits, without involving any changes in the principles of the invention.

Our device is intended primarily for the use of workmen and others who are called upon to rewind or alter the connections of an electric machine or system, since by its use the operator avoids the necessity of having a separate diagram for each system of winding and connecting. It is also of use to students in studying various types of electrical connections, and in fact, it may be employed by any one having use for such diagrams.

In the accompanying drawings a preferred form of the indicator is illustrated, having means for showing the internal connections, known as single star, single delta, double star, and double delta, of a polyphase alternating current motor, the particular diagrams illustrated being for a three-phase six-pole machine, which is the most widely used type. The same diagrams may also be used by anyone skilled in the art, for connecting a machine having a greater or less number of poles, and by constructing the indicator with other diagrams in the place of those illustrated, it may be employed to show connections of other types and for other purposes.

In the drawings—Figure 1 is a view of the obverse face of our indicator, showing the movable member in position to exhibit a diagram of single star connection, Fig. 2 is a view similar to Fig. 1, showing the movable member in position to exhibit a diagram of single delta connection. Fig. 3 is a view of the reverse face of the indicator, showing the movable member in a position to exhibit a double star diagram. Fig. 4 is a view similar to Fig. 3, showing the movable member in a position to exhibit a double delta diagram.

Referring more particularly to the drawings, the reference numeral 1 designates a back member, preferably of the shape illustrated, and formed of any suitable material, as, for example, celluloid, sheet metal, or card board. A pair of movable members 2 and 3, preferably of the same material and substantially in the form of disks, are mounted, one upon each face of the back member 1, and pivotally connected thereto by a common pivot 4. These movable members are independent of each other, and are designed to be so used, the object being to secure a greater number of indications with a single device than would be possible were but one movable member provided.

Upon the exposed faces of the movable disks 2 and 3 are electrical diagrams, in the present case representing the field coils 5 of a three-phase six-pole alternating current motor, and the wires 6 by which the successive coils of each phase are connected together. The lines 7, representing the terminal connections of each phase are run to the periphery of the disk, and by the rotation of said disks to certain definite positions, said terminal connection lines 7 are made to register with lines 8 upon the back plate 1 outside the periphery of said disks, to show diagrammatically the complete field connections of the motor from the supply wires, the latter being represented by lines 9ª, 9ᵇ, and 9ᶜ.

The disks 2 and 3 are enlarged, as shown at 2′ and 3′, for a portion of their circumferences, said enlargements being adapted to cover and conceal the portions of the diagrams upon the back member which do not form integral parts of the particular complete diagrams exposed to view. In order to correctly locate the disks 2 and 3 in their several indicating positions, so that the portions of the diagrams upon said disks will register correctly with those upon the back member 1, suitable locating marks are provided, as, for example, an arrow 10 upon each of said disks, near the periphery thereof, and corresponding arrows 11 and 12 upon said back member. A segmental aperture 13 is also provided in each of said disks, through which suitable inscriptions may be exposed to view in each position of the disks, as, for example, "single star", "single delta", "double star", and "double delta". The back member 1 is preferably formed with an extended lower portion 1', upon which may be inscribed any desired data, as, for example, directions for the use of the device, and said extended portion also provides convenient means for grasping and holding the device during the use thereof.

In practice it will be well to draw the different phases of all the diagrams in different colors to make it easy to trace each connection.

We claim:—

1. An indicator for electrical connections comprising a plurality of relatively movable associated members, each having inscribed thereon portions of electrical diagrams, and adapted to be moved into a plurality of positions to bring the portions of said diagrams into mutual registry to form a complete diagram in each of said positions.

2. An indicator for electrical connections comprising a back member having inscribed thereon portions of electrical diagrams, and a movable member associated therewith, said movable member also having inscribed thereon a portion of an electrical diagram, and being adapted to be moved into a plurality of positions to bring successive portions of said diagrams into mutual registry to form a different complete diagram in each of said positions.

3. An indicator for electrical connections comprising a back member having inscribed thereon portions of electrical diagrams, a movable member associated therewith, said movable member also having inscribed thereon a portion of an electrical diagram, and being adapted to be moved into a plurality of positions to bring successive portions of said diagrams into mutual registry to form a different complete diagram in each of said positions, and means carried by said movable member for concealing the portions of the diagrams upon said back member not pertinent to the exposed complete diagram.

4. An indicator for electrical connections comprising a back member having inscribed thereon portions of electrical diagrams, and a movable member rotatably mounted in superposed relation thereon, said movable member also having inscribed thereon a portion of an electrical diagram, and being adapted to be moved into a plurality of positions to bring successive portions of said diagrams into mutual registry to form a different complete diagram in each of said positions.

5. An indicator for electrical connections comprising a back member having inscribed thereon portions of electrical diagrams, and a substantially circular member rotatably mounted thereupon, said rotatable member also having inscribed thereon a portion of an electrical diagram, and being adapted to be rotated into a plurality of positions to bring successive portions of said diagrams into mutual registry to form a different complete diagram in each of said positions.

6. An indicator for electrical connections comprising a back member having inscribed thereon portions of electrical diagrams, a substantially circular member rotatably mounted thereupon, said rotatable member also having inscribed thereon a portion of an electrical diagram, and being adapted to be rotated into a plurality of positions to bring successive portions of said diagrams into mutual registry to form a different complete diagram in each of said positions, and a radially extended portion carried peripherally upon said rotatable member for concealing the portions of the diagrams upon said back member not pertinent to the exposed complete diagram.

7. An indicator for electrical connections comprising a back member having inscribed thereon portions of electrical diagrams, and a movable member rotatably mounted in superposed relation thereon, said movable member also having inscribed upon its exposed face a portion of an electrical diagram, and being adapted to be rotated into a plurality of positions to bring successive portions of said diagrams into mutual registry to form a different complete diagram in each of said positions, and said movable member being further provided with an aperture for exposing a different portion of said back member in each of said positions.

8. An indicator for electrical connections comprising a back member having inscribed thereon portions of electrical diagrams, and a movable member rotatably mounted in superposed relation thereon, said movable member also having inscribed upon its exposed face a portion of an electrical diagram, and being adapted to be rotated into a plurality of positions to bring successive portions of said diagrams into mutual registry to form a different complete diagram in each of said positions, and said movable member being further provided with an arcuate concentric aperture for exposing a different portion of said back member in each of said positions.

9. An indicator for electrical connections comprising a back member having inscribed thereon portions of electrical diagrams, and a movable member rotatably mounted in superposed relation thereon, said movable member also having inscribed upon its exposed face a portion of an electrical diagram, and being adapted to be rotated into a plurality of positions to bring successive portions of said diagrams into mutual registry to form a different complete diagram in each of said positions, and means for locating said movable member in said positions.

10. An indicator for electrical connections comprising a back member having inscribed upon each face thereof portions of electrical diagrams, and a pair of movable members associated therewith, one superposed upon each of said faces, and mounted for independent rotation upon a common pivot, each of said movable members also having inscribed upon its exposed face a portion of an electrical diagram, and being adapted to be rotated into a plurality of positions to bring the incomplete diagram inscribed thereon into registry with one of the incomplete diagrams upon said back plate, to form a different complete diagram in each of said positions.

In testimony whereof we have signed our names to this specification in the presence of two subscribing witnesses.

OSCAR C. SUTHERLAND.
EDW. M. McLAUGHLIN.

Witnesses:
W. F. Faber,
Robt. G. Lee.